United States Patent [19]
Rainer

[11] Patent Number: 5,169,883
[45] Date of Patent: Dec. 8, 1992

[54] PRODUCT FOR THE ABSORPTION OF DISSOLVED IONS

[76] Inventor: Norman B. Rainer, 2008 Fondulac Rd., Richmond, Va. 23229

[21] Appl. No.: 668,929

[22] Filed: Mar. 13, 1991

Related U.S. Application Data

[63] Continuation-in-part of Ser. No. 395,535, Aug. 18, 1989, Pat. No. 5,002,984.

[51] Int. Cl.[5] .......................... C08L 11/00; C08J 5/20; B01D 15/00; C08G 69/26
[52] U.S. Cl. ............................... 524/30; 524/35; 521/25; 521/30; 210/688; 106/168; 525/417; 527/312; 528/341; 528/342
[58] Field of Search .................... 524/30, 35; 521/25, 521/30; 528/348, 342; 106/168; 210/688; 525/417; 527/317

[56] References Cited

U.S. PATENT DOCUMENTS

| | | | |
|---|---|---|---|
| 3,580,891 | 5/1971 | Rainer | 528/355 |
| 3,715,339 | 2/1973 | Rainer | 524/30 |
| 4,332,916 | 6/1982 | Thill | 521/25 |
| 5,096,946 | 3/1992 | Rainer | 524/30 |

OTHER PUBLICATIONS

CA115 (12): 118065w, "Polymer Treated Sponge Product for Selective Absorption of Metal Ions", Norman Rainer.

*Primary Examiner*—John Kight, III
*Assistant Examiner*—P. Hampton-Hightower
*Attorney, Agent, or Firm*—Norman B. Rainer

[57] ABSTRACT

An open celled sponge product for ion absorption is provided comprised of regenerated cellulose wall material and insolubilized polyethyleneimime (PEI) derived from the interaction of PEI with a polyfunctional carboxylic acid. The insolubilized PEI is further caused to contain ionized tertiary amino nitrogen groups which increase the selective absorption capacity of the product for certain anions.

3 Claims, No Drawings

PRODUCT FOR THE ABSORPTION OF DISSOLVED IONS

RELATED APPLICATIONS

This application is a continuation-in-part of U.S. patent application Ser. No. 395,535, filed Aug. 18, 1989, now U.S. Pat. No. 5,002,984.

BACKGROUND OF THE INVENTION

1. Field of the Invention

This invention relates to a porous product for abstracting dissolved ions from aqueous solutions, and more particularly concerns a porous product having an improved ability to selectively absorb anions.

2. Description of the Prior Art

U.S. patent application Ser. No. 07/395,535, filed Aug. 18, 1989 now U.S. Pat. No. 5,002,984 discloses an open celled product useful in selectively abstracting dissolved ions from aqueous solutions. The product is comprised of a regenerated cellulose sponge and a water insoluble polymer durably associated with the cellulose. The polymer is essentially a polyethyleneimine (PEI) that has been insolubilized by a polycarboxylic acid in a thermal curing step. The PEI contains primary, secondary and tertiary amine nitrogen atoms. The primary and secondary nitrogen atoms interact with the polycarboxylic acid to form amide bonds, thereby causing insolubilization of the PEI.

U.S. patent application Ser. No. 07/561,006, filed Jul. 31, 1990 pending discloses a particularly preferred small cuboid configuration of the sponge product having a uniform distribution of polymer throughout the sponge and providing improved characteristics during manufacture and use.

Although the aforesaid sponge product can selectively absorb cations and anions, there is a need for improved absorption performance for certain anions. For example, the following anions pose significant challenge for either economic or ecological reason: $AuCN_2^-$, the dissolved form of gold produced by cyanide leach operations, is generally sought to be scavenged from mine waste tailings; $CrO_4^{-2}$, chromate ion, is a toxic substance employed in preventing microbial growth in cooling tower water, its removal being troublesome; $Ag(S_2O_3)_2^{-3}$, generated by photographic fixer solutions containing thiosulfate, produces serious toxic contamination when discharged into surface waters; and $UO_4^{-2}$, produced in the course of uranium mining, causes radioactive contamination in ground waters.

It is accordingly an object of the present invention to provide a porous sponge product having improved affinity for anion species, particularly anion species containing a metal element.

It is another object of this invention to provide a product as in the foregoing object which employs a cellulosic sponge containing PEI that has been insolubilized by thermal interaction with a polycarboxylic acid.

It is a further object of the present invention to provide a product of the aforesaid nature comprised of small size cuboid sponge and amenable to easy production.

These objects and other objects and advantages of the invention will be apparent from the following description.

SUMMARY OF THE INVENTION

The above and other beneficial objects and advantages are accomplished in accordance with the present invention by an open celled sponge product of cuboid configuration comprised of regenerated cellulose wall material and a water insoluble polymer durably associated with said cell wall material. The polymer is an insolubilized PEI produced by thermal interaction of PEI with a polycarboxylic acid and containing ionized tertiary amino nitrogen groups of the formula:

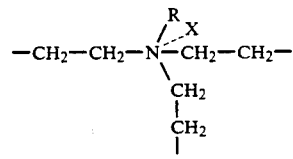

where R is a member selected from the group consisting of hydrogen and alkyl, alkylene and aralkyl hydrocarbon quarternizing radicals, and X is a negatively charged ion selected from the group consisting of $Cl^-$, $Br^-$, $I^-$, $SO_4^=$, $NO_3^-$, and $HPO_4^=$. The X moiety is shown attached to the central nitrogen atom by a dashed line which represents an ionic bond wherein the nitrogen atom has a positive charge and the X moiety has a negative charge of equal value.

DESCRIPTION OF THE PREFERRED EMBODIMENTS

Suitable sponge for use in the practice of this invention is an open celled sponge whose cell wall interconnective or pellicular material is comprised of regenerated cellulose. Such sponges are generally manufactured by the heat treatment of a confined mixture of granular sodium sulfate decahydrate and "green" viscose. The heat treatment coagulates and regenerates the cellulose while also melting away the sodium sulfate. The resultant product is produced in slab form having flat parallel upper and lower primary surfaces. The slab is then cut to produce sponges of cuboid configuration.

The dimensions of the sponge product have been found to be of critical significance. One reason for the dimensional criticality is that the thermal treatment required to insolubilize the PEI is also likely to cause thermal and oxidative degradation of the polymer and cellulose, particularly in the peripheral regions of the sponge. When curing conditions are chosen to minimize such degradation, it has been found that interior regions are inadequately cured when the sponge is large.

The cuboid configuration of the sponge product of this invention is comprised of said flat parallel primary surfaces spaced apart by a distance representing an X axis having a length between about 5 and 25 mm, and joined by a sidewall perimeter comprised of four surfaces orthogonally disposed to said primary surfaces and causing said sponge to have at least one plane of symmetry perpendicular to said primary surfaces and including the X axis. The shortest straight line spanning said perimeter while perpendicularly intersecting said X axis is considered to be a Y axis, and the longest straight line distance spanning said perimeter while perpendicularly intersecting said X axis is considered to be a Z axis. The sum of the X and Y axes should preferably be in the range of 10–60 mm, and the Z axis is preferably less than six times the X axis, and less than 90 mm. Each of the six faces which define the cuboid configuration have a substantially parallelogram shape, causing the cuboid configuration to be substantially a prism-shaped parallelepiped.

The PEI useful in producing the product of this invention is water-soluble, having a molecular weight between about 1200 and 40,000. PEI in the lower range of said molecular weight is generally preferred because the resultant insolubilized polymer appears to be more intimately bound to the cellulosic wall structure of the sponge. The PEI in general is a branched polymer comprising primary, secondary and tertiary amino nitrogens separated by ethylene groups of the formula —$CH_2$—$CH_2$—.

Preferred cross-linking agents for insolubilizing the PEI include low molecular weight aliphatic polycarboxylic acids such as malonic, succinic, and glutaric acids, and nitrilotriacetic acid (NTA). When NTA is employed, the preferred ratio of NTA/PEI has been found to be within the range of 0.8 to 1.3.

To achieve the insolubilization of the PEI in situ, namely within the cellulosic sponge, a homogeneous aqueous precursor solution is initially formed which contains the PEI and cross-linking agent. The precursor solution is then impregnated into the cellulosic sponge. The solids content of the precursor solution is preferably in the range of 20% to 45%. Solutions more concentrated than 45% become viscous and do not adequately penetrate the cellulose sponge. The sponge is preferably saturated with the precursor solution and then squeezed to remove excess solution. The thus treated sponge will typically contain an amount of solution between 90% and 200% of its starting dry weight.

The cellulosic sponge impregnated with the precursor solution is heated to evaporate off water, and is subsequently heated at a curing temperature in the range of 130 degrees C. to 165 degrees C. for 20 to 80 minutes to effect insolubilization of the PEI. The sponge product is then washed with water, which swells the sponge and removes traces of unreacted PEI and cross-linking agent. The final product should contain between 30% and 50% insolubilized PEI (dry weight basis) in order to be of practical value in water treatment operations. The actual amount of insolubilized PEI in the sponge can be ascertained either by weight considerations during manufacture, or by determination of the nitrogen content of the sponge product.

The extent to which the PEI becomes cross-linked is dependent upon the ratio of cross-linking agent to PEI and the duration and severity of thermal curing. It has been found that, only within a narrow range of cross-linking, will the insolubilized PEI become durably attached to the cellulose. The degree of cross-linking or insolubilization of the PEI is best characterized by its ability to absorb water. Insolubilized PEI having the proper degree of cross-linking to be effective in the product of the present invention will absorb water to the extent of between 100% and 250% of its dry weight.

The water absorption characteristic of the insolubilized PEI is best measured by creating the insolubilized PEI separately from the sponge, and measuring its water-absorption propensity. Accordingly, a quantity of the precursor solution may be placed in a beaker as a thin layer and heated under the same conditions of time, temperature and air circulation as employed to make the sponge product. In such manner, the insolubilized PEI polymer is obtained as a clear, bubbled amber-colored brittle substance. When water is added, the bubbled shape disintegrates by decrepitation to form water-swollen granules. A quantity of the water-swollen granules is placed on a blotter to remove excess water. A weighed quantity of the blotted granules is then dried at 95 degrees C. until a constant weight is achieved, thereby determining the water contained in the water-swollen granules. Those polymers produced by the aforesaid method having a water absorption value below 100% are too highly cross-linked to remain attached to the cellulose when the sponge is immersed in water. Those polymers having a water absorption value over 250% lack adequate cohesive strength to be durably retained by the cellulose.

An alternative way of ascertaining the water absorption characteristic of the polymer is to compare the water absorption level of the product in comparison with the water absorption level of the initial cellulose sponge which is generally in the range of 350% to 400%. Accordingly, by this method, the % water absorption of the product is less than that of the starting sponge.

When produced in the aforesaid manner, the insolubilized PEI polymer will have unreacted or free tertiary amine groups. The transformation of said tertiary amine groups to the ionized form of the present invention is preferably achieved by way of a post-treatment wherein the sponge, containing insolubilized PEI, is contacted with an appropriate reagent. In those instances where R is hydrogen, the transformation is achieved by employing an aqueous solution of 3%–5% concentration of a strong mineral acid such as HCl, $H_2SO_4$, $HNO_3$ or $H_3PO_4$. The treatment is best carried out by immersing the sponges within such aqueous solutions for a period of at least 30 minutes, followed by a thorough washing with water to remove any excess mineral acid.

In those instances where R is alkyl, alkylene, or alkaryl, transformation may be achieved by contacting the sponge with quaternizing agents such as: methyl bromide, 1, 2 dichloroethane, benzyl chloride, and other halogenated hydrocarbons, and alkylating agents such as dimethyl sulfate. Since said compounds are generally insoluble in water, treatment of the sponge is best carried out by exposing the sponge to vapors of said compounds for a sufficient period of time and at suitable temperature to achieve the desired transformation.

A further understanding of my invention will be had from a consideration of the following examples which illustrate certain preferred embodiments. All parts and percentages are by weight unless otherwise indicated. It is understood that the instant invention is not to be construed as being limited by said examples or by the details therein.

EXAMPLE 1

One hundred and twenty parts of nitrilotriacetic acid (NTA) were mixed with 140 parts PEI of molecular weight 1800, and 500 parts of water at 40 degrees C. to form a precursor solution having a solids content of 34.2%. Pieces of open celled sponge of regenerated cellulose in the form of cubes measuring 9 mm per side were impregnated with the precursor solution and then squeezed between rollers to produce damp sponges having about 170% add-on of precursor solution. The sponges were dried at 120 degrees C. until dry, then cured at 155 degrees C. for 55 minutes, and washed with water. The resultant sponge product was found, by Kjeldahl analysis, to be comprised of 33% (dry weight basis) of insolubilized PEI.

Some of the precursor solution was alternatively placed in a petri dish and dried and cured under the same conditions employed for the sponge product. The resultant insolubilized PEI was washed with water, which caused self-granulation. The resultant granules were found to have a water absorption capacity of 156%.

Separate batches of the above-prepared polymer-containing sponge were subjected to treatments with various reagents in order to transform tertiary nitrogen groups to an ionized form. Accordingly, separate batches of the sponges were soaked in 4% aqueous solutions of HCl, $H_2SO_4$, $HNO_3$ and $H_3PO_4$ for 3 hours at 25 degrees C., followed by thorough washing with water. The extent of transformation was confirmed by elemental analyses for Cl, S and P and functional group analysis for $NO^-_3$.

In further separate batches employing organic reagents, the sponges were maintained in a sealed autoclave at 40 degrees C. for 24 hours in contact with excess amounts of the organic reagent. The thus treated sponges were swept with heated nitrogen gas to remove excess reagent. In such manner, the following organic reagents were separately employed: methyl iodide, ethyl bromide, 1,2 dichloro ethane, and benzyl chloride. The completion of the transformation was verified by elemental analysis for halogen.

EXAMPLE 2

A tube fabricated of transparent acrylic polymer, having an inside diameter of 4 inches and a porous bottom plate, was employed as an absorption column for testing the sponge products of Example 1. In each test, sufficient sponge was added to the column to form a bed of about 24 inch height. Application of a slight vacuum to the top of the column is employed to deaerate the sponges and cause them to settle within the tube.

An aqueous test solution containing 32 ppm of $K_2CrO_4$ was caused to flow downwardly through the bed of sponges at a rate of 0.1 bed volume/minute. After 20 gallons of test solution passed through the bed, distilled water was entered to achieve thorough washing. Sponges from the uppermost layer of the bed were taken for determination of chromium content by way of atomic absorption analysis. By virtue of this method of testing, the saturation content of the sponge product for chromate ion is ascertained.

The samples tested and results obtained are reported in Table 1 wherein the column headed "reagent" refers to the manner of post-treatment of the sponge to transform tertiary amine to ionic form. The column headed "% chromium" designates % chromium (dry weight basis) in the saturated, washed sponge.

TABLE 1

| Reagent | % Chromium |
| --- | --- |
| none | 2.1 |
| HCl | 5.5 |
| $HNO_3$ | 5.1 |
| 1,2 dichloro ethane | 4.9 |
| methyl bromide | 4.4 |

As the data indicate, when the tertiary nitrogen group is converted into ionic form according to the present invention, a considerably higher uptake of chromate anion is achieved. It is to be noted that 1,2 dichloroethane probably interacts with two different tertiary nitrogen groups. This results in an ethylene bridge, namely R is $—CH_2—CH_2—$, and is generically considered to be an alkylene radical. In the case of methyl bromide, R is a methyl or alkyl radical, and X is $Cl^-$.

EXAMPLE 3

A sponge product is fabricated as in Example 1 with the exception that NTA is stoichimetrically replaced with succinic acid. In separate batches, the polymer-containing sponge product was post treated to convent tertiary amino groups into ionic form. The sponges were subsequently placed in a shaker jar containing 1000 cc of a dilute aqueous solution of thiosulfate photographic fixer containing 53 ppm of silver complexed as thiosulfate anion and 224 ppm of free thiosulfate.

The solutions and sponges were shaken gently for 24 hours. The residual silver content of the solution was determined, along with the dry weight of the sponge. In such manner, the data of table 2 was obtained, wherein the column headed "Reagent" refers to the post-treatment regent, and the column headed "% Ag absorbed" designates % Ag (dry weight basis) in the sponge as determined by atomic absorption technique. The weight of each sponge sample was maintained below one gram to assure saturation conditions for the sponge.

TABLE 2

| Reagent | % Chromium |
| --- | --- |
| none | 2.1 |
| $H_2SO_4$ | 3.2 |
| Iodoethane | 3.5 |
| benzyl chloride | 3.3 |
| 1,2 dichloroethane | 3.8 |

As the data of table 2 suggest, the post-treatment of the sponge to achieve ionization of the tertiary nitrogen provides a significant increase in silver uptake. It is to be noted that, because of the large excess of free thiosulfate ion in the test solution, the effect of the ionized tertiary nitrogens cannot be attributed merely to an increase in ion exchange capacity of the polymer. The increase in silver uptake is therefore a selective effect.

EXAMPLE 4

A sponge product is fabricated as in Example 1 with the exception that a ratio of NTA/PEI of 1.1 is employed. In separate batches, the polymer-containing sponge product was post-treated to convert tertiary amino groups into ionic form. The sponges were subsequently placed in a shaker jar containing 100 cc of a gold-containing test solution. The test solution had been prepared by dissolving finely powdered elemental gold in an aqueous solution containing 0.05% NaCN, to product a solution containing 95 ppm gold as $AuCN_2^-$ and 385 ppm of free $CN^-$.

The solutions and sponges were shaken gently for 24 hours. The residual gold content of the solution was determined, along with the dry weight of the sponge. In such manner, the data of table 3 was obtained, wherein the column headed "Reagent" refers to the post-treatment reagent, and the column headed "% Au absorbed" designates % Au (dry weight basis) in the sponge as determined by atomic absorption technique. The weight of each sponge sample was maintained less than a gram to assure saturation conditions for the sponge.

TABLE 3

| Reagent | % Chromium |
| --- | --- |
| none | 3.1 |

TABLE 3-continued

| Reagent | % Chromium |
| --- | --- |
| HCl | 5.4 |
| 1,2 dichloroethane | 5.9 |
| methyl iodide | 5.7 |

As the data of table 3 suggest, the post-treatment of the sponge to achieve ionization of the tertiary nitrogen provides a significant increase in gold uptake. It is to be noted that, because of the large excess of free $CN^-$ in the test solution, the effect of the ionized tertiary nitrogens cannot be attributed merely to an increase in ion exchange capacity of the polymer. The increase in gold uptake is therefore a selective effect.

In a generally similar manner, the post-treatment to convert the tertiary amino nitrogens into ionic form has been found to increase the uptake capacity of the sponge product for anions such as $SeO_4^{-2}$, $AsO_4^{-3}$ and $UO_4^{-2}$.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An open celled sponge product comprised of regenerated cellulose wall material and insolubilized polyethyleneimine (PEI) having been produced from the thermal interaction of PEI with a polycarboxylic acid and further containing ionized tertiary amino nitrogen groups of the formula

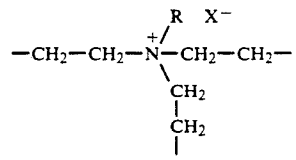

where R is a member selected from the group consisting of hydrogen and alkyl, alkylene and aralkyl hydrocarbon quarternizing radicals, and X is a negatively charged ion selected from the group consisting of $Cl^-$, $Br^-$, $I^-$, $SO_4^=$, $NO_3^-$ and $HPO_4^=$, said insolubilized PEI having a water absorption capacity between 100% and 250%, said sponge product having a cuboid configuration comprised of paired flat parallel primary surfaces spaced apart by a distance representing an X axis having a length between about 5 and 25 mm, and joined by a sidewall perimeter comprised of four surfaces orthogonally disposed to said primary surfaces and causing said sponge to have at least one plane of symmetry perpendicular to said primary surfaces and including the X axis, the shortest straight line distance spanning said perimeter while perpendicularly intersecting said X axis being considered to be a Y axis, and the longest straight line distance spanning said perimeter while perpendicularly intersecting said X axis being considered to be a Z axis, the sum of the X and Y axes being in the range of 10–60 mm, and the Z axis being less than six times the X axis, and less than 90 mm.

2. The product of claim 1 wherein said the polycarboxylic acid is nitrolotriacetic acid (NTA).

3. The product of claim 1 wherein the ratio of NTA/PEI employed to product said insolubilized PEI is between 0.8 and 1.3.

* * * * *